(12) United States Patent
Chen et al.

(10) Patent No.: US 12,540,084 B2
(45) Date of Patent: Feb. 3, 2026

(54) DEEP PURIFICATION DEVICE AND METHOD FOR METHANOL-TO-OLEFIN WASHING WATER

(71) Applicants: East China University of Science and Technology, Shanghai (CN); Shanghai Huachang Environmental Protection Co., Ltd, Shanghai (CN); Shaanxi Petroleum Yanan Energy Chemical Industry Limited Liability Company, Shaanxi (CN)

(72) Inventors: Jianqi Chen, Shanghai (CN); Hualin Wang, Shanghai (CN); Wenjie Lv, Shanghai (CN); Ting Lei, Shaanxi (CN); Liang Chen, Shaanxi (CN); Tianxiang Wang, Shaanxi (CN); Xiaobin Xue, Shaanxi (CN); Bing Liu, Shanghai (CN); Xin Cui, Shanghai (CN); Weichi Sang, Shanghai (CN); Jinsong Wang, Shanghai (CN); Jinlan Feng, Shanghai (CN); Hongpeng Ma, Shanghai (CN); Wei Yuan, Shanghai (CN); Bin Hu, Shanghai (CN); Yujie Ji, Shanghai (CN)

(73) Assignees: East China University of Science and Technology q, Shanghai (CN); Shanghai Huachang Environmental Protection Co., Ltd, Shanghai (CN); Shaanxi Petroleum Yanan Energy Chemical Industry Limited Liability Company, Shaanxi (CN)

(*) Notice: Subject to any disclaimer, the term of this patent is extended or adjusted under 35 U.S.C. 154(b) by 381 days.

(21) Appl. No.: 18/026,770

(22) PCT Filed: Sep. 17, 2020

(86) PCT No.: PCT/CN2020/115845
§ 371 (c)(1),
(2) Date: Mar. 16, 2023

(87) PCT Pub. No.: WO2022/056775
PCT Pub. Date: Mar. 24, 2022

(65) Prior Publication Data
US 2023/0339785 A1 Oct. 26, 2023

(51) Int. Cl.
*C02F 1/40* (2023.01)
*B01D 17/04* (2006.01)
(Continued)

(52) U.S. Cl.
CPC .............. *C02F 1/40* (2013.01); *B01D 17/045* (2013.01); *C02F 1/28* (2013.01); *C02F 1/006* (2013.01);
(Continued)

(58) Field of Classification Search
CPC .................................... B01D 17/045
(Continued)

(56) References Cited

U.S. PATENT DOCUMENTS 6,486,219 B1 * 11/2002 Janda ................. C10G 3/52
518/706
2002/0132864 A1 * 9/2002 Searle .................... C01B 32/50
518/713
(Continued)

FOREIGN PATENT DOCUMENTS

CN 103723790 A 4/2014
CN 107382654 A 11/2017
(Continued)

OTHER PUBLICATIONS

International Search Report mailed May 26, 2021 in corresponding International PCT Patent Application No. PCT/CN2020/115845 (3 pages).

*Primary Examiner* — Vickie Y Kim
(74) *Attorney, Agent, or Firm* — Greenberg Traurig, LLP; Melissa Hunter-Ensor; Nathan Hsu

(57) ABSTRACT

The present disclosure relates to a deep purification device and method for methanol-to-olefin washing water. Provided is a deep purification device for methanol-to-olefin washing water, comprising: a quench tower (1-1), a water washing tower (1-2) connected to an outlet at the top of the quench tower (1-1), a boiling bed separator (1-3) having the top thereof connected to the bottom of the water washing tower (1-2), a fiber coalescer (1-4) connected to the bottom of the boiling bed separator (1-3), and a buffer settling tank (1-5) connected to the sidewall of the boiling bed separator (1-3) at a position near the top. Further provided is a deep purification method for methanol-to-olefin washing water.

2 Claims, 3 Drawing Sheets

(51) Int. Cl.
*C02F 1/28* (2023.01)
*C02F 1/00* (2023.01)
*C02F 101/32* (2006.01)
*C02F 103/36* (2006.01)

(52) U.S. Cl.
CPC .... *C02F 2001/007* (2013.01); *C02F 2101/32* (2013.01); *C02F 2103/36* (2013.01); *C02F 2201/005* (2013.01); *C02F 2209/03* (2013.01); *C02F 2303/10* (2013.01); *C02F 2303/16* (2013.01)

(58) Field of Classification Search
USPC ......................................................... 585/809
See application file for complete search history.

(56) References Cited

U.S. PATENT DOCUMENTS

| | | |
|---|---|---|
| 2015/0368168 A1 | 12/2015 | Senetar et al. |
| 2023/0339785 A1* | 10/2023 | Chen ..................... B01D 17/045 |
| 2023/0365449 A1* | 11/2023 | Wang ........................ C02F 9/00 |
| 2023/0406728 A1* | 12/2023 | Lv ...................... B01D 17/0205 |

FOREIGN PATENT DOCUMENTS

| | | | |
|---|---|---|---|
| CN | 107720872 A | | 2/2018 |
| CN | 108328761 A | | 7/2018 |
| CN | 207628144 U | | 7/2018 |
| CN | 110015800 A | | 7/2019 |
| CN | 110980981 A | * | 4/2020 |
| CN | 111170552 A | | 5/2020 |

* cited by examiner

DEEP PURIFICATION DEVICE AND METHOD FOR METHANOL-TO-OLEFIN WASHING WATER

CROSS-REFERENCE TO RELATED APPLICATION

This application is the U.S. National Stage Application, pursuant to 35 U.S.C. § 371, of PCT International Application No. PCT/CN2020/115845, filed Sep. 17, 2020, the contents of which are incorporated herein by reference in its entirety.

TECHNICAL FIELD

The present disclosure pertains to the field of comprehensive treatment of environmental pollutants, and relates to a deep purification device for methanol-to-olefins washing water, a purification method using said purification device, and a comprehensive treatment method for recovery of waste liquid and waste gas generated during regeneration of said purification device, and residual heat in the purified washing water.

BACKGROUND ART

Manufacture of olefins from methanol, referred to as MTO (Methanol to Olefins), refers to a process for preparation of low-carbon olefins by catalytic reaction using methanol as a raw material. The reaction is generally implemented in a fluidized bed reactor, and the catalyst currently used is SAPO-34 molecular sieve. The high-temperature product gas in the reactor is passed through a three-stage cyclone separator to recover catalyst particles. The product gas from which the catalyst has been recovered is sent to a quench tower for cooling. Due to the limited precision of the cyclone separator, a small amount of fine powder catalyst having a particle size of less than 10 μm or less than 5 μm is not separated and entrained by the product gas. After washing in the quench tower, most of the fine powder catalyst is left in the quench water, and a small portion goes to the water washing tower. Meanwhile, unreacted methanol, dimethyl ether and other oxygen-containing organic compounds and a small amount of reaction by-products such as aromatic hydrocarbons and alkanes enter the quench tower and the water washing tower together with the reaction gas. Due to the high operating temperature in the quench tower and the short contact time between the product gas and the quench water, most of the oxygen-containing organic compounds and hydrocarbons enter the washing water.

As a result, the washing water usually contains catalyst powder, oxygen-containing organic compounds such as methanol and dimethyl ether, and oil-like waxy substances such as aromatic hydrocarbons and alkanes. In sequence to guarantee normal operation of the water system, it is necessary to effectively remove the catalyst and oil/wax-like substances from the washing water. The oil/wax-like substances in the washing water are mainly heavy components such as aromatic hydrocarbons and alkanes. Depending on the oil droplet size, these substances are mainly present in the forms of free oil, dispersed oil and emulsified oil.

At present, the common methods for removing solid and oil from wastewater mainly include physical methods, chemical methods, physical-chemical methods and biological methods. The physical methods mainly include gravity method, centrifugal separation method, precision filtration method, membrane separation method, etc. The gravity method has poor separation accuracy, and cannot remove emulsified oil from washing water. The separating effect is poor when the centrifugal separation method is used to separate fine oil droplets or sub-micron particles. Because particles having a small particle size and a small amount of oil-wax present in the MTO washing water can easily enter the channels of the filter element of a precision filtration device, they block the channels, and can hardly be removed by online backwashing. The membrane separation method is widely used in recent years due to its excellent separating effect, but it has the disadvantages of easy blockage, high maintenance fee and high cost due to the high solid content and oil content of MTO washing water. The chemical methods mainly include flocculation method, oxidation method, electrochemical method, etc. The flocculation method has poor treatment effect on emulsified oil and fine particles. In addition, the treatment agents are expensive, and it is easy to produce secondary pollution. Chemical oxidants such as ozone, Fenton reagent and the like may be used to degrade organics in wastewater to improve biodegradability, but the treatment cost is high. The electroflocculation method needs to consume a large quantity of auxiliary salt reagents and electricity, and the operating cost is high. The physical-chemical methods mainly include air flotation method, adsorption method, coagulation method, etc. The air flotation method needs to consume chemicals, and needs a large footprint. The adsorbent used in the adsorption method has a limited adsorption capacity and a high cost, and its regeneration is difficult. The coagulation method is simple in operation, and needs a small footprint, but a coagulant needs to be added, and the cost is high. Although the biochemical method has a low cost, a low investment and no secondary pollution, it needs a large footprint. In addition, the methanol-to-olefins wastewater contains a high concentration of pollutants and a large amount of organic components, which will affect the normal operation of the biochemical tank.

Chinese Patent Application CN103951098A proposes use of an ultrafiltration membrane to separate and purify washing water and quench water, and recovery of catalyst and oil with a three-phase separator. In this application, the membrane separation technology is used to treat washing water. Fine treatment is achieved for fine particles, but a large flow of washing water with a high oil content is prone to causing rise of pressure difference during the treatment, and the treatment efficiency is low. Additionally, the filter unit is a series of filter membranes. During backwashing, due to the high solid content and oil content of the concentrate, the filter membranes in series intensify the rise of the pressure difference, which is not conducive to stable and continuous running of the high flux treatment process.

Chinese Patent Applications CN102093153A and CN101352621A propose use of the microcyclone technology to perform microcyclone separation on MTO quench water and washing water to remove catalyst particles entrained therein. A microcyclone separator has the advantages of wide adaptability, low cost, easy maintenance, etc, but the separation efficiency for fine particles below 3 μm in washing water is limited. In addition, the washing water contains a large amount of oxygen-containing compounds and oil-wax, and thus the microcyclone separator has poor separating effect on the oil fraction.

Chinese Patent Application for Invention CN104649446A discloses a liquid-solid separation method and device for MTO quench water and washing water. The method proposes use of three or more filters connected in parallel.

Although the filters have good separating effect on solid particles in water, it is not mentioned whether they have the function of removing oil from the washing water.

Chinese Utility Model Patent CN205031975U discloses a device for purification and treatment of MTO quench water and washing water. Microporous filter elements in different forms are used in the device for filtration. Online cleaning and regeneration of the filter elements are implemented by introducing effective gas and using a chemical cleaning method. However, the backwashing process of this system is complicated and time-consuming. Additionally, the equipment investment is large, and the operating cost is high.

Chinese Utility Model Patent CN204275622U discloses a device for filtration of MTO washing water. The filtration is conducted with a filter element comprising a porous inner structure and a surface layer coated with a metal film. Blockage in the inner part of the filter element can be alleviated effectively, and the filtration precision is high. However, the cost of the device is high, and the maintenance fee of the device is also high. Moreover, the filter element requires chemical regeneration which is inclined to cause secondary pollution.

Chinese Patent Application for Invention CN108328761A discloses a method and device for extending the continuous operation cycle of an MTO washing water treatment process, wherein a fluidized bed separation technology is used to treat methanol-to-olefins washing water. This method has a long operation cycle, low cost and low energy consumption, and it has good separating effect on the catalyst particles in the washing water. However, the separating effect on the oil/wax-like organic substances in the washing water is mediocre. Furthermore, the oil components in the washing water are complex, and they have different morphologies. Free oil and dispersed oil may be separated by the fluidized bed, but deep processing is necessitated to separate emulsified oil. Therefore, it is difficult for a single device or technology to meet the requirements of deep processing.

In summary, the requirements for treating highly concentrated methanol-to-olefins waste water containing oil and solid cannot be satisfied by the traditional physical methods due to the high cost and poor treatment effect, or by the traditional chemical methods due to the secondary pollution caused by the consumption of chemicals and the difficulty in recycling water after treatment, or by the traditional physical-chemical methods due to the consumption of chemicals and high operating cost, or by the traditional biochemical methods due to the slow treatment speed and the poor adaptability of active sludge. Therefore, there is an urgent need for a simple and effective treatment process to address the poor separating effect of the existing methods.

SUMMARY

The present disclosure provides a novel device and method for deep purification of methanol-to-olefins washing water, thereby solving the problems existing in the prior art.

One object of the present disclosure is to provide a device for deep purification of methanol-to-olefins washing water, which has a long continuous operation cycle and excellent separating effect on catalyst particles and oil/wax in the washing water.

Another object of the present disclosure is to provide a purification method using the above device.

In a first aspect, the present disclosure provides a device for deep purification of methanol-to-olefins washing water, comprising:
a quench tower,
a water washing tower coupled to an outlet at a top of the quench tower,
a fluidized bed separator whose top is coupled to a bottom of the water washing tower,
a fiber coalescer coupled to a bottom of the fluidized bed separator, and
a buffer settling tank coupled to a sidewall of the fluidized bed separator at a position near the top.

In a preferred embodiment, the fluidized bed separator includes a plurality of fluidized bed separators arranged in parallel, wherein each fluidized bed separator is provided with an inlet at the top, an outlet at the bottom, and a drain port and an exhaust port at the sidewall near the top; wherein the bottom of the water washing tower is coupled to each inlet through a centrifugal pump, wherein the drain ports are all coupled to a common pipeline G1 which is then coupled to the buffer settling tank; wherein the exhaust ports are all coupled to a common pipeline G2 which is then coupled to a cyclone deliquoring tank; wherein a bottom of the cyclone deliquoring tank is coupled to the pipeline G1; wherein the outlet of each fluidized bed separator at the bottom is coupled to a pipeline G3; wherein the pipelines G3 are coupled to a common pipeline G4; wherein another end of the pipeline G4 is coupled to the fiber coalescer; wherein a nitrogen/steam pipeline and a washing water pipeline are coupled to each of the pipelines G3.

In another preferred embodiment, each inlet is provided with an inlet valve; each outlet is provided with an outlet valve; each drain port is provided with a drain valve, and each exhaust port is provided with an exhaust valve; a nitrogen/steam access valve is provided at a joint between the nitrogen/steam pipeline and each pipeline G3; and a backwash valve is provided at a joint between the washing water pipeline and each pipeline G3.

In another preferred embodiment, the fluidized bed separator comprises a fluidized bed separator housing, wherein the fluidized bed separator housing is provide with an inlet at a top thereof, an outlet at a bottom thereof, a drain port at a sidewall thereof at a position near the top, and an exhaust port at the top; wherein a three-phase cyclone separator, a feed distributor, a granular bed, and a partition plate are provided in the fluidized bed separator housing sequentially from top to bottom; wherein a vortex breaker is provided inside the outlet; wherein an entrance of the three-phase cyclone separator is coupled to the inlet; wherein the drain port is coupled to a side surface of the three-phase cyclone separator; and wherein a fluid distributor is provided on an upper surface of the partition plate.

In another preferred embodiment, the fiber coalescer includes a plurality of fiber coalescers arranged in parallel, wherein each fiber coalescer is provided with an inlet at a left end thereof, and an oil phase outlet and an aqueous phase outlet at a top and a bottom of the fiber coalescer at a right side thereof, respectively; wherein another end of the pipeline G4 is coupled to the inlet through a pipeline G5; and wherein each oil phase outlet is coupled to the pipeline G1 through a pipeline G6.

In another preferred embodiment, the fiber coalescer includes a fiber coalescer housing, wherein the fiber coalescer housing is provided with an inlet at a left end thereof, and an oil phase outlet and an aqueous phase outlet at a top and a bottom of the fiber coalescer housing at a right side thereof, respectively; wherein the fiber coalescer housing is sequentially provided with, from left to right, an inlet rectifying distributor, an oil droplet coarsening coalescence module, a modified corrugated reinforced settling module, and a nano-modified deep separation module.

In another preferred embodiment, the device further includes an industrial control computer, wherein the inlet valve, outlet valve, drain valve, exhaust valve, nitrogen/steam access valve, and backwash valve are all solenoid valves, and are all electrically coupled to the industrial control computer via conducting wires; wherein a differential pressure transducer is further installed on the granular bed; wherein the differential pressure transducer is electrically coupled to the industrial control computer through a conducting wire.

In another aspect, the present disclosure provides a method for deep purification of methanol-to-olefins washing water using the above device, wherein the method comprises the following steps:

Step 1: Starting a power supply, and setting a filter pressure drop value and a regeneration operation time for the fluidized bed separator using the industrial control computer;

Step 2: Opening the inlet valve and outlet valve to allow for normal operation of the device, wherein washing water is drawn out from the bottom of the water washing tower through the centrifugal pump, and enters the fluidized bed separator through the inlet at the top of the fluidized bed separator in which the washing water is sent to the granular bed through the feed distributor, wherein after the washing water is separated by the granular bed, it passes through the fluid distributor on the partition plate, passes through the vortex breaker, and is sent to the fiber coalescer from the outlet at the bottom of the fluidized bed separator, wherein the washing water enters the fiber coalescer through the inlet of the fiber coalescer in which the washing water passes through the inlet rectification distributor and enters the oil droplet coarsening coalescence module, the modified corrugated reinforced settling module and the nano-modified deep separation module in sequence, so that fine emulsified oil droplets left in the washing water from the outlet of the fluidized bed are subjected to adhesion to a hydrophilic-hydrophobic fiber, collision, growth and separation to allow for gradual movement of the oil droplets to an upper oil layer and rapid sinking of water droplets, wherein a clear liquor of the washing water is discharged from the aqueous phase outlet and sent to a reboiler under a propylene rectification column of an olefin separating device as a heat source for partial recovery of residual heat of the washing water, wherein after heat exchange, the clear liquor is subjected to further heat exchange through an air cooler and a heat exchanger, and is returned to the water washing tower, wherein the waste oil is discharged from the oil phase outlet to the buffer settling tank to achieve oil-water separation, wherein differential pressure transducer values of the fluidized bed separator are monitored in real time during the normal operation of the device;

Step 3: starting a regeneration operation when the set filter pressure drop value is detected by the differential pressure transducer, at which time the inlet valve and outlet valve are closed; the drain valve, exhaust valve, backwash valve, and nitrogen/steam access valve are opened, wherein the washing water is changed to enter the fluidized bed separator from the outlet, and at the same time nitrogen is mixed into the washing water which then passes through the granular bed from bottom to top to bring the granular bed to a boiling state, so that fine catalyst powder and oil-wax organic matter adhered to a separating medium are released, thereby cleaning and regenerating the medium, wherein the separating medium and pollutants enter the three-phase cyclone separator at the top of the fluidized bed separator to allow for cleaning of particles of the medium in a cyclone field, strengthened regeneration of the medium, and recovery of the particles of the medium at the same time, wherein the pollutants are discharged from the drain port at the side surface of the device along with the liquid phase, and nitrogen is discharged from the exhaust port at the top; and Step 4: Closing the drain valve, exhaust valve, backwash valve, and nitrogen/steam access valve, and opening the inlet valve and outlet valve when the set regeneration operation time is reached, so that the device continues to operate normally; and so on.

In a preferred embodiment, in step 1, the filter pressure drop value is set to 0.1-0.4 MPa; the regeneration operation time is set to 20-60 minutes; and a separation precision of the catalyst in the washing water is set to D85=0.1 μm.

In another preferred embodiment, a content of the catalyst particles in the methanol-to-olefins washing water is 100-500 mg/L; an average particle diameter of the solid catalyst particles is 0.5-5 μm; and a content of the oil is 200-1000 mg/L.

Beneficial Effects:

1) The present disclosure combines granular bed filtration and fiber coalescence, which addresses the problem of the insufficient separation efficiency of the original fluidized bed separator for oil in washing water, and at the same time, effectively avoids the problem of the pollution caused by the catalyst particles in the washing water to the inner parts of the fiber coalescer. Meanwhile, the comprehensive treatment of the waste liquid and waste gas generated in the regeneration of the purification device and the recovery of the residual heat of the purified washing water are achieved, so as to realize near zero discharge of the pollutants, near zero landfill of the waste, and effective utilization of the heat.

2) The present disclosure makes use of the functions of the granular bed separating medium in the fluidized bed separator in screening, intercepting, and adsorbing the particles and oil-wax in the water to reduce the solid content and oil content in the water gradually with the depth of the filter layer. Subsequently, the hydrophilic-hydrophobic fiber in the fiber coalescer is utilized to achieve physical breaking of emulsion to fulfil the purpose of deep oil-water separation. Compared with membrane filtration and precision filtration, this method needs simple equipment, low investment, low energy consumption, easy regeneration of separating medium, long continuous operation cycle and low maintenance fee. It has excellent separating effect on catalyst particles and oil-wax in washing water with a simple separation process. It overcomes the deficiencies of the existing process, including easy blockage of the separation equipment, the need of frequent cleaning, a short equipment operation cycle, and incomplete removal of oil-wax and solid particles in the water.

3) The present disclosure uses a fluidized bed process to regenerate separating medium, and at the same time, strengthens the effect of medium regeneration by means of the cyclone shearing action of a top three-phase separator. The hydrophilic-hydrophobic fiber in the fiber coalescer is used to separate water and oil which are then discharged out. The method is suitable for purification of methanol-to-olefins washing water having a high oil content.

DESCRIPTION OF THE DRAWINGS

The accompanying drawings are provided for further understanding of the disclosure. They constitute a part of the specification only for further explanation of the disclosure without limiting the disclosure.

Figure 1:
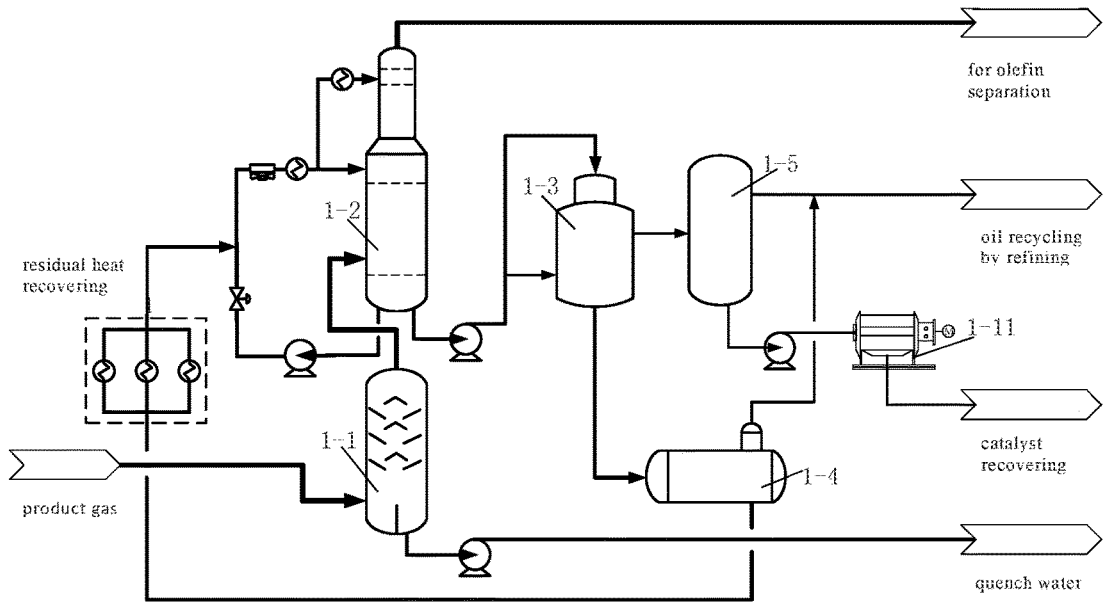
FIG. 1 is a schematic view showing the structure of a device for deep purification of methanol-to-olefins washing water according to a preferred embodiment of the present disclosure.

The reference numbers in the figures are described as follows:

- 1-1. Quench tower; 1-2. Water washing tower; 1-3. Fluidized bed separator; 1-4. Fiber coalescer; 1-5. Buffer settling tank; 1-6. Cyclone deliquoring tank; 1-7. Nitrogen/steam pipeline; 1-8. Washing water pipeline; 1-9. Industrial control computer; 1-10. Differential pressure transducer; 1-11. Pressure filter;
- 1. Inlet; 2. Outlet; 3. Drain port; 4. Exhaust port;
- 2-1. Inlet valve; 2-2. Outlet valve; 2-3. Drain valve; 2-4. Exhaust valve; 2-5. Nitrogen/steam access valve; 2-6. Backwash valve;
- 3-1. Oil trap; 3-2. Air flotation pool; 3-3. Biochemical unit; 3-4. Biological aerated filter; 3-5. Sand filtration unit;
- 4-1. Fluidized bed separator housing; 4-2. Granular bed; 4-3. Partition plate; 4-4. Fluid distributor; 4-5. Feed distributor; 4-6. Vortex breaker; 4-7. Three-phase cyclone separator;
- 5-1. Fiber coalescer housing; 5-2. Inlet; 5-3. Inlet rectifying distributor; 5-4. Oil droplet coarsening coalescence module; 5-5. Modified corrugated reinforced settling module; 5-6. Nano-modified deep separation module; 5-7. Aqueous phase outlet; 5-8. Oil phase outlet.

DETAILED DESCRIPTION

Based on the study on the microscopic movement of fine particles, the regulation of the structural alignment, the regularity of particle aggregation and the regulation of the mechanism of capture of the microdispersed phase by the particles, the inventors of the present application have developed the fluidized bed separation technology, wherein the collision and adsorption functions of the separating medium, and the high-precision interception function of the microchannels formed by the separating medium are utilized to effectively remove the fine particles and some oily organic substances in the washing water. The microchannel separation is different from the membrane separation. Because the microchannels are not fixed, include long passages and have a large capacity for pollutants, the problem of blockage by pollutants can be avoided effectively. In addition, based on the study on the liquid-liquid-solid interface coalescence kinetics, the regulation of the flow structure of the fiber channels, and the emulsion breaking and oil removing mechanisms of the reinforced structure of the hydrophilic/hydrophobic fiber combination, the inventors have developed the fiber coalescence technology, wherein the deep emulsion breaking function of the highly efficient emulsion-breaking coalescence module is utilized to effectively remove the nano-micron oily organic substances left in the washing water. Additionally, the fiber coalescer can allow for penetration of trace suspended matter. The combined process of the two separation technologies of fluidized bed separation and fiber coalescence is expected to effectively solve the problem of deep removal of oil and solids in the methanol-to-olefins wastewater confronted by the existing technology.

In a first aspect of the present disclosure, there is provided a device for deep purification of methanol-to-olefins washing water, comprising a quench tower, wherein an outlet at the top of the quench tower is coupled to a water washing tower; wherein the bottom of the water washing tower is coupled to the top of a fluidized bed separation system through a centrifugal pump; wherein the bottom of the fluidized bed separation system is coupled to a fiber coalescence system, and wherein a buffer settling tank is additionally coupled to the sidewall of the fluidized bed separation system at a position near the top.

In the present disclosure, the fluidized bed separation system includes a plurality of fluidized bed separators arranged in parallel, wherein an inlet is provided at the top of the fluidized bed separator; an outlet is provided at the bottom of the fluidized bed separator; and a drain port and an exhaust port are provided at the sidewall of the fluidized bed separator near the top; wherein the bottom of the water washing tower is coupled to each inlet through a centrifugal pump; wherein the drain ports are all coupled to a common pipeline G1 which is then coupled to the buffer settling tank; wherein the exhaust ports are all coupled to a common pipeline G2 which is then coupled to a cyclone deliquoring tank; wherein the bottom of the cyclone deliquoring tank is coupled to the pipeline G1; wherein the outlet of each fluidized bed separator at the bottom is coupled to a pipeline G3; wherein the pipelines G3 are coupled to a common pipeline G4; wherein another end of the pipeline G4 is coupled to the fiber coalescence system; wherein a nitrogen/steam pipeline and a washing water pipeline are coupled to each of the pipelines G3.

In the present disclosure, each inlet is provided with an inlet valve; each outlet is provided with an outlet valve; each drain port is provided with a drain valve; and each exhaust port is provided with an exhaust valve; a nitrogen/steam access valve is provided at a joint between the nitrogen/steam pipeline and each pipeline G3; and a backwash valve is provided at a joint between the washing water pipeline and each pipeline G3.

In the present disclosure, the fluidized bed separator comprises a fluidized bed separator housing, wherein an inlet is provide at the top of the fluidized bed separator housing; an outlet is provide at the bottom of the fluidized bed separator housing; a drain port is provide at the sidewall of the fluidized bed separator housing at a position near the top; and an exhaust port is provide at the top of the fluidized bed separator housing; wherein a three-phase cyclone separator, a feed distributor, a granular bed, and a partition plate are provided in the fluidized bed separator housing sequentially from top to bottom; wherein a vortex breaker is provided inside the outlet; wherein an entrance of the three-phase cyclone separator is coupled to the inlet; wherein the drain port is coupled to the side surface of the three-phase cyclone separator; and wherein a fluid distributor is provided on the upper surface of the partition plate. The fiber coalescence system includes a plurality of fiber coalescers arranged in parallel, wherein an inlet is provided at the left end of the fiber coalescer; and an oil phase outlet and an aqueous phase outlet are provided at the top and the bottom of the fiber coalescer respectively at the right side; wherein another end of the pipeline G4 is coupled to the inlet through a pipeline G5; and wherein each oil phase outlet is coupled to the pipeline G1 through a pipeline G6.

In the present disclosure, the fiber coalescer includes a fiber coalescer housing, wherein an inlet is provided at the left end of the fiber coalescer housing; and an oil phase outlet and an aqueous phase outlet are provided at the top and the bottom of the fiber coalescer housing respectively at the right side; wherein the fiber coalescer housing is sequentially provided with, from left to right, an inlet rectifying distributor, an oil droplet coarsening coalescing module, a modified corrugated reinforced settling module, and a nano-modified deep separation module.

In the present disclosure, the device further includes an industrial control computer, wherein the inlet valve, outlet valve, drain valve, exhaust valve, nitrogen/steam access valve, and backwash valve are all solenoid valves, and the inlet valve, outlet valve, drain valve, exhaust valve, nitrogen/steam access valve, and backwash valve are all electrically coupled to the industrial control computer via conducting wires; wherein a differential pressure transducer is further installed on the granular bed; wherein the differential pressure transducer is electrically coupled to the industrial control computer through a conducting wire.

In a second aspect, the present disclosure provides a method for deep purification of methanol-to-olefins washing water, wherein the above device for deep purification of methanol-to-olefins washing water is used in the method, wherein the method comprises the following steps:

Step 1: Starting a power supply, and setting a filter pressure drop value and a regeneration operation time for the fluidized bed separator using the industrial control computer; Step 2: Opening the inlet valve and outlet valve to allow for normal operation of the device, wherein washing water is drawn out from the bottom of the water washing tower through the centrifugal pump, and enters the fluidized bed separator through the inlet at the top of the fluidized bed separator in which the washing water is sent to the granular bed through the feed distributor, wherein after the washing water is separated by the granular bed, it passes through the fluid distributor on the partition plate, passes through the vortex breaker, and is sent to the fiber coalescer from the outlet at the bottom of the fluidized bed separator, wherein the washing water enters the fiber coalescer through the inlet of the fiber coalescer in which the washing water passes through the inlet rectification distributor and enters the oil droplet coarsening coalescence module, the modified corrugated reinforced settling module and the nano-modified deep separation module in sequence, so that fine emulsified oil droplets left in the washing water from the outlet of the fluidized bed are subjected to adhesion to a hydrophilic-hydrophobic fiber, collision, growth and separation to allow for gradual movement of the oil droplets to an upper oil layer and rapid sinking of water droplets, wherein a clear liquor of the washing water is discharged from the aqueous phase outlet and sent to a reboiler under a propylene rectification column of an olefin separating device as a heat source for partial recovery of residual heat of the washing water, wherein after heat exchange, the clear liquor is subjected to further heat exchange through an air cooler and a heat exchanger for the washing water, and is returned to the water washing tower, wherein the waste oil is discharged from the oil phase outlet to the buffer settling tank to achieve the purpose of oil-water separation, wherein differential pressure transducer values of the fluidized bed separator are monitored in real time during the normal operation of the device;

Step 3: starting a regeneration operation when the set filter pressure drop value is detected by the differential pressure transducer, at which time the inlet valve and outlet valve are closed; the drain valve, exhaust valve, backwash valve, and nitrogen/steam access valve are opened, wherein the washing water is changed to enter the fluidized bed separator from the outlet, and at the same time nitrogen is mixed into the washing water which then passes through the granular bed from bottom to top to bring the granular bed to a boiling state, so that fine catalyst powder and oil-wax organic matter adhered to a separating medium are released, thereby cleaning and regenerating the medium, wherein the separating medium and pollutants enter the three-phase cyclone separator at the top of the fluidized bed separator to allow for cleaning of particles of the medium in a cyclone field, strengthened regeneration of the medium, and recovery of the particles of the medium at the same time, wherein the pollutants are discharged from the drain port at the side surface of the device along with the liquid phase, and nitrogen is discharged from the exhaust port at the top; and Step 4: Closing the drain valve, exhaust valve, backwash valve, and nitrogen/steam access valve, and opening the inlet valve and outlet valve when a set regeneration operation time is reached, so that the device continues to operate normally; and the above steps are repeated in cycles.

In the present disclosure, in step 1, the filter pressure drop value is set to 0.1-0.4 MPa, preferably 0.3 MPa; the regeneration operation time is set to 20-60 minutes, preferably 40 minutes; and a separation precision of the catalyst in the washing water is set to $D_{85}=0.1$ μm.

In the present disclosure, a content of the catalyst particles in the methanol-to-olefins washing water is 100-500 mg/L; an average particle diameter of the solid catalyst particles is 0.5-5 μm; and a content of the oil is 200-1000 mg/L.

Reference will be now made to the accompanying drawings.

FIG. 1 is a schematic view showing the structure of a device for deep purification of methanol-to-olefins washing water according to a preferred embodiment of the present disclosure. As shown by FIG. 1, the device comprises a quench tower 1-1, wherein an outlet at the top of the quench tower 1-1 is coupled to a water washing tower 1-2; wherein the bottom of the water washing tower 1-2 is coupled to the top of a fluidized bed separator 1-3 through a centrifugal pump; wherein the bottom of the fluidized bed separator 1-3 is coupled to a fiber coalescer 1-4, and wherein a buffer settling tank 1-5 is additionally coupled to the sidewall of the fluidized bed separator 1-3 at a position near the top. The bottom of the buffer settling tank 1-5 is coupled to a pressure filter 1-11 through a centrifugal pump. A product gas enters the quench tower 1-1 through the inlet of the quench tower 1-1. The quench water is discharged from the outlet of the quench tower 1-1 via a centrifugal pump. The residual heat generated by the fiber coalescer 1-4 is recovered and returned to the water washing tower 1-2. The top product from the water washing tower 1-2 is sent for olefin separation. The top products from the buffer settling tank 1-5 and the fiber coalescer 1-4 are sent for oil recycling by refining. The catalyst obtained by the pressure filter 1-11 is recovered.

Figure 2:
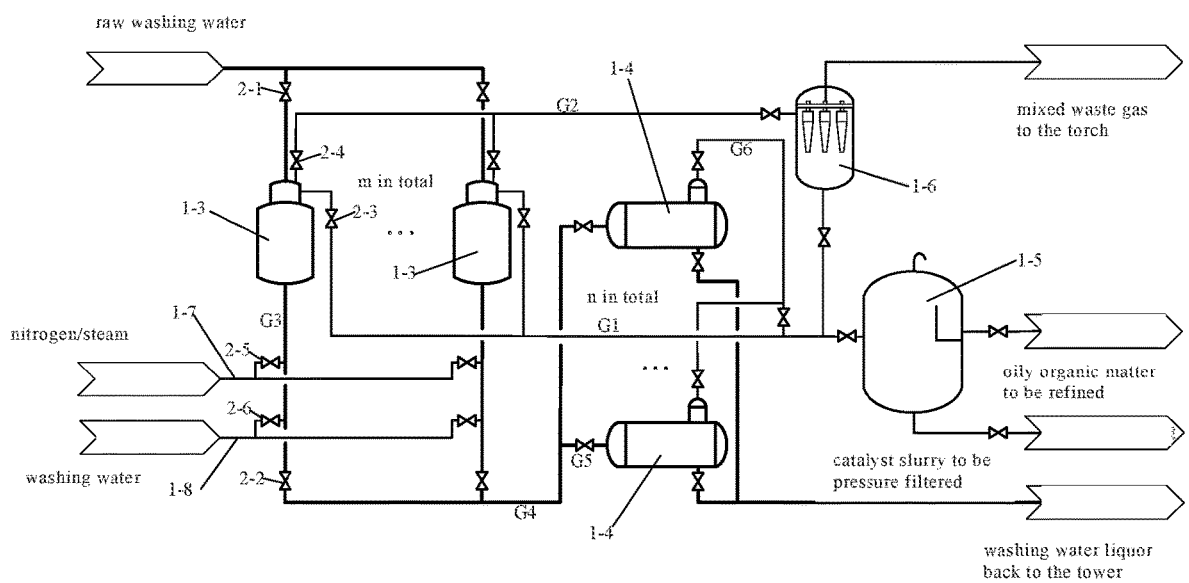
FIG. 2 is a schematic view showing the structure of the system of fluidized bed separation and fiber coalescence in the device for deep purification of methanol-to-olefins washing water according to a preferred embodiment of the present disclosure.

FIG. 2 is a schematic view showing the system of fluidized bed separation and fiber coalescence in the device for deep purification of methanol-to-olefins washing water according to a preferred embodiment of the present disclosure. As shown by FIG. 2, the fluidized bed separation system includes a plurality of (m in total, m being greater or equal to 2) fluidized bed separators 1-3 arranged in parallel, wherein an inlet is provided at the top of the fluidized bed separator 1-3; an outlet is provided at the bottom of the fluidized bed separator 1-3; and a drain port and an exhaust port are provided at the sidewall of the fluidized bed separator 1-3 near the top; wherein the bottom of the water washing tower is coupled to each inlet through a centrifugal pump; wherein the drain ports are all coupled to a common pipeline G1 which is then coupled to the buffer settling tank 1-5; wherein the exhaust ports are all coupled to a common pipeline G2 which is then coupled to a cyclone deliquoring tank 1-6; wherein the bottom of the cyclone deliquoring tank 1-6 is further coupled to the pipeline G1; wherein the outlet of each fluidized bed separator 1-3 at the bottom is coupled to a pipeline G3; wherein the pipelines G3 are coupled to a common pipeline G4; wherein another end of the pipeline G4 is coupled to the fiber coalescence system; wherein a nitrogen/steam pipeline 1-7 and a washing water pipeline 1-8 are coupled to each of the pipelines G3; wherein each inlet is provided with an inlet valve 2-1; each outlet is provided with an outlet valve 2-2; each drain port is provided with a drain valve 2-3; and each exhaust port is provided with an exhaust valve 2-4; a nitrogen/steam access valve 2-5 is provided at a joint between the nitrogen/steam pipeline 1-7 and each pipeline G3; and a backwash valve 2-6 is provided at a joint between the washing water pipeline 1-8 and each pipeline G3.

The fiber coalescence system includes a plurality of (n in total, n being greater or equal to 2) fiber coalescers 1-4 arranged in parallel, wherein an inlet is provided at the left end of the fiber coalescer 1-4; and an oil phase outlet and an aqueous phase outlet are provided at the top and the bottom of the fiber coalescer respectively at the right side; wherein another end of the pipeline G4 is coupled to the inlet through a pipeline G5; and wherein each oil phase outlet is coupled to the pipeline G1 through a pipeline G6.

The raw washing water is introduced through the inlet valve 2-1; the nitrogen/steam is introduced through the nitrogen/steam access valve 2-5; and the washing water is introduced through the backwash valve 2-6. The mixed waste gas from the top of the cyclone deliquoring tank 1-6 goes to a torch; the clear liquor of the washing water from the bottom of fiber coalescers 1-4 is returned to the tower; the catalyst slurry from the bottom of buffer settling tank 1-5 is sent for pressure filtration; and the oily organic substances from the sidewall is sent for recycling by refining.

Figure 3:
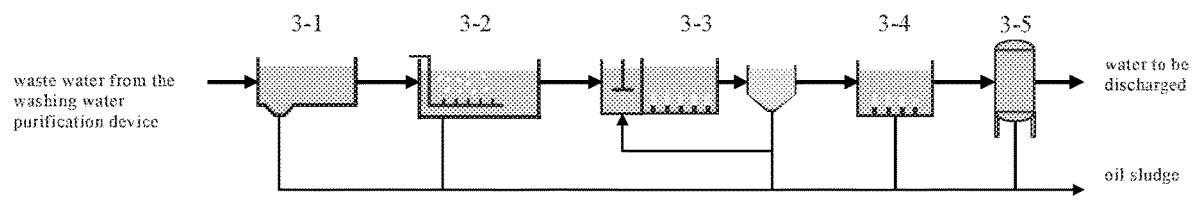
FIG. 3 is a schematic view showing a processing flow chart of a washing water purification device discharging waste water to a sewage treatment plant according to a preferred embodiment of the present disclosure.

FIG. 3 is a schematic view showing a processing flow chart of a washing water purification device discharging waste water to a sewage treatment plant according to a preferred embodiment of the present disclosure. As shown by FIG. 3, the average flow of the wastewater discharged from the washing water purification device to the sewage treatment plant is 3t/h. The wastewater from the washing water purification device is first sent to an oil trap 3-1 in which the suspended matter and oil are initially separated from the wastewater by way of the difference of the suspended matter, oil and water in specific gravity. The wastewater treated by the oil trap 3-1 is sent to an air flotation pool 3-2 in which the suspended floccules and small oil droplets in the wastewater further flocculate and grow, and combine with the bubbles released by the aerated water to form large floccules that rise to the water surface under the action of buoyancy and rising water, thereby further separating the oil and solids in the wastewater. After the air flotation treatment, the waste water is sent to a biochemical unit 3-3 in which COD (chemical oxygen demand) substances, ammonia nitrogen, oil/fat and the like are removed from the wastewater by microbial degradation. Then, the wastewater is sent to an biological aerated filter 3-4 in which the COD substances, ammonia nitrogen, oil/fat, suspended matter and the like are further removed from the wastewater by means of the oxidative degradation function of the biofilm on the surface of the filter material and the interception function of the filter material in the filter tank. Finally, the wastewater is sent to a sand filtration unit 3-5 for deep removal of the suspended matter from the wastewater, and then the water is drained or reused. Sludge is discharged from the bottoms of the oil trap 3-1, the air flotation pool 3-2, the biochemical unit 3-3, the biological aerated filter 3-4 and the sand filtration unit 3-5.

Figure 4:
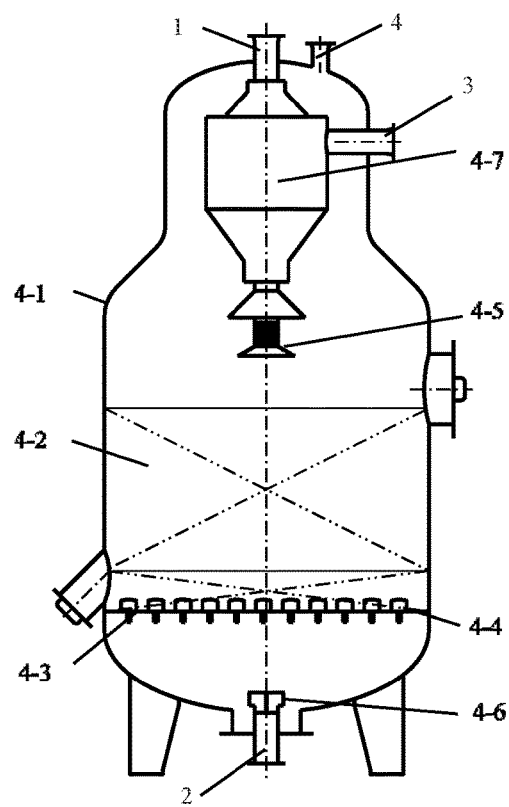
FIG. 4 is a schematic view showing the structure of a fluidized bed separator in a device for deep purification of methanol-to-olefins washing water according to a preferred embodiment of the present disclosure.

FIG. 4 is a schematic view showing the structure of a fluidized bed separator in a device for deep purification of methanol-to-olefins washing water according to a preferred embodiment of the present disclosure. As shown by FIG. 4, the fluidized bed separator comprises a fluidized bed separator housing 4-1, wherein the fluidized bed separator housing 1-4 is provide with an inlet 1 at the top, an outlet 2 at the bottom, a drain port 3 at the sidewall at a position near the top, and an exhaust port 4 at the top. A three-phase cyclone separator 4-7, a feed distributor 4-5, a granular bed 4-2, and a partition plate 4-3 are provided in the fluidized bed separator housing sequentially from top to bottom. A vortex breaker 4-6 is provided inside the outlet 2. An entrance of the three-phase cyclone separator 4-7 is coupled to the inlet 1. The drain port 3 is coupled to the side surface of the three-phase cyclone separator 4-7. A fluid distributor 4-4 is provided on the upper surface of the partition plate 4-3.

Figure 5:
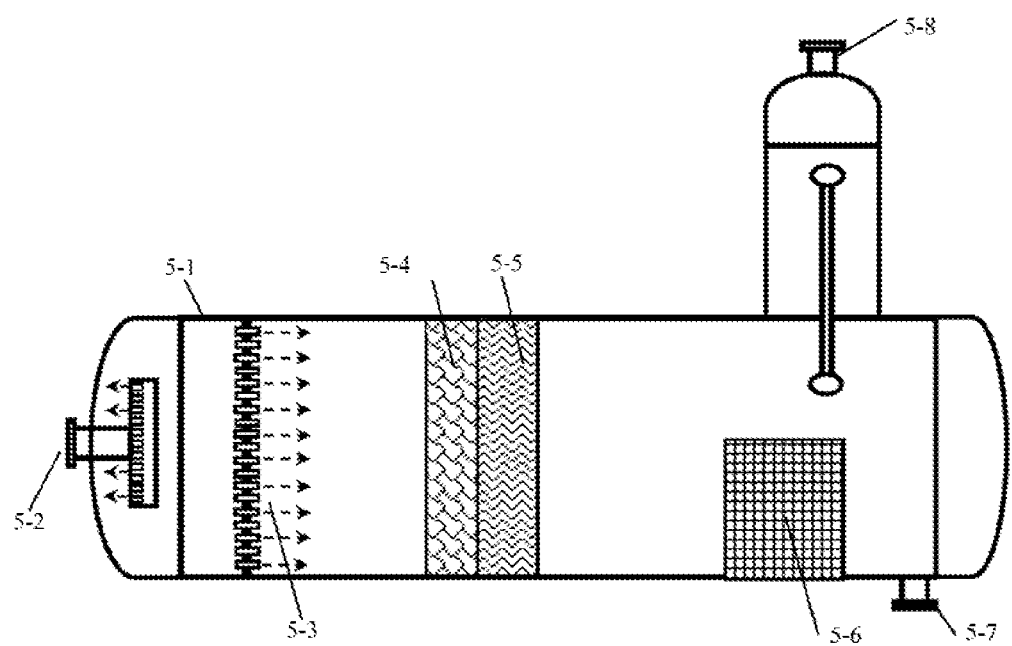
FIG. 5 is a schematic view showing the structure of a coalescer in a device for deep purification of methanol-to-olefins washing water according to a preferred embodiment of the present disclosure.

FIG. 5 is a schematic view showing the structure of a coalescer in a device for deep purification of methanol-to-olefins washing water according to a preferred embodiment of the present disclosure. As shown by FIG. 5, the fiber coalescer includes a fiber coalescer housing 5-1, wherein an inlet 5-2 is provided at the left end of the fiber coalescer housing 5-1; and an oil phase outlet 5-8 and an aqueous phase outlet 5-7 are provided at the top and the bottom respectively at the right side. The fiber coalescer housing 5-1 is sequentially provided with, from left to right, an inlet rectifying distributor 5-3, an oil droplet coarsening coalescing module 5-4, a modified corrugated reinforced settling module 5-5, and a nano-modified deep separation module 5-6.

Figure 6:
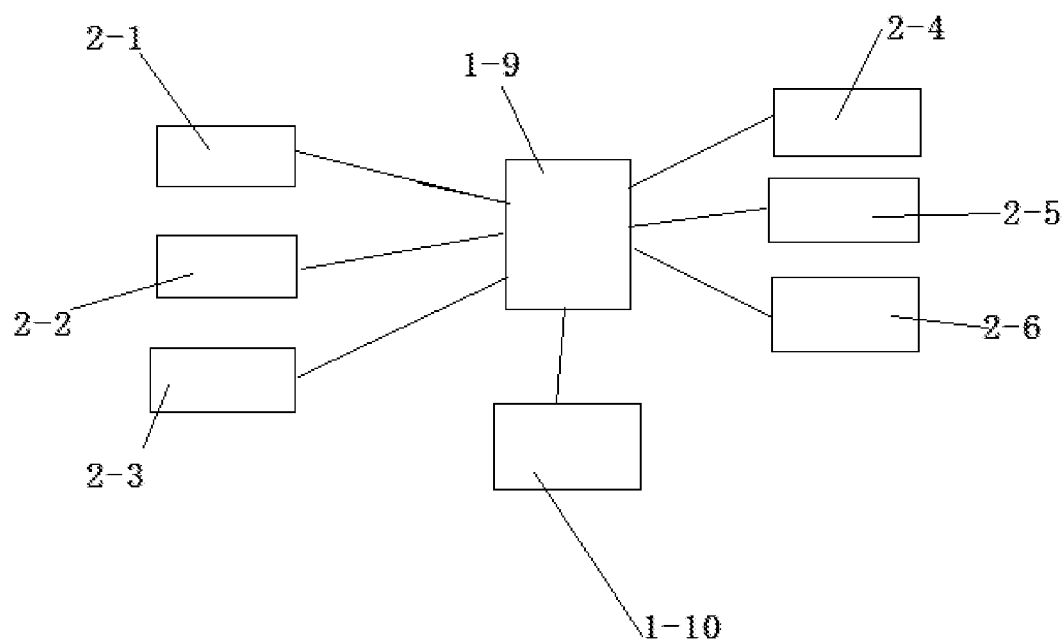
FIG. 6 is a diagram showing electrical connection between a fluidized bed separator in a device for deep purification of methanol-to-olefins washing water and an industrial control computer according to a preferred embodiment of the present disclosure.

FIG. 6 is a diagram showing electrical connection between a fluidized bed separator in a device for deep purification of methanol-to-olefins washing water and an industrial control computer according to a preferred embodiment of the present disclosure. As shown by FIG. 6, the inlet valve 2-1, outlet valve 2-2, drain valve 2-3, exhaust valve 2-4, nitrogen/steam access valve 2-5, and backwash valve 2-6 are all solenoid valves, and they are all electrically coupled to an industrial control computer 1-9 via conducting wires. A differential pressure transducer 1-10 is further installed on the granular bed. The differential pressure transducer 1-10 is electrically coupled to the industrial control computer 1-9 through a conducting wire.

The working principle of the device for deep purification of methanol-to-olefins washing water according to the present disclosure is as follows:

When the device is operated normally, the inlet valve 2-1 and outlet valve 2-2 are opened, and the drain valve 2-3, exhaust valve 2-4, backwash valve 2-6, and nitrogen/steam access valve 2-5 are closed. The washing water is drawn out from the bottom of the water washing tower 1-2 through a centrifugal pump, enters the fluidized bed separator 1-3 from the inlet 1 at the top of the fluidized bed separator 1-3, passes through the granular bed from top to bottom, thereby filtering the methanol-to-olefins washing water to remove the particulate matter, free oil and dispersed oil in the water. The primarily purified washing water comes out from the outlet 2 at the bottom, and is sent to a plurality of fiber coalescers 1-4 in parallel for secondary deep purification. The aqueous phase purified by the fluidized bed is subjected to physical emulsion breaking by the hydrophilic-hydrophobic fiber in the fiber coalescer 1-4 to achieve oil-water separation. The clear liquor of the washing water is discharged from the aqueous phase outlet 5-7 at the bottom of the fiber coalescer, and as a heat source, sent to a reboiler under the propylene rectification tower of the olefin separation device to recover the residual heat of the washing water partially. After the heat exchange, it is subjected to further heat exchange through an air cooler and a heat exchanger for the washing water, and then returned to the water washing tower. The waste oil is discharged from the oil phase outlet 5-8 at the top of the fiber coalescer 1-4. When the fluidized bed separators 1-3 run continuously until the pressure difference rises to 0.3 MPa, the plurality of fluidized bed separators are switched to backwash operation in turn. During backwashing, the inlet valve 2-1 and outlet valve 2-2 of the corresponding fluidized bed separator 1-3 are closed, and the drain valve 2-3, exhaust valve 2-4, nitrogen/steam access valve 2-5 and backwash valve 2-6 are opened. The raw washing water and nitrogen are fed to bring the granular bed in the separator to a boiling state, so that the pollutants intercepted and adsorbed in the granular bed are released, thereby achieving regeneration of the separating medium. The pollutant slurry produced in the regeneration is discharged from the drain port 3 and sent to a buffer settling tank 1-5 for oil-water settling separation. The upper oil phase in the buffer settling tank 1-5 is sent to a waste oil refining system for recycling, and the lower catalyst slurry is sent to a pressure filtration unit for pressure filtration treatment to recover the catalyst, thereby achieving near-zero landfill of waste. The waste water containing trace oil and solids produced by the pressure filtration unit is discharged to a sewage treatment plant. After the organic matter and suspended matter are removed from the waste water, the water up to the standard is discharged to the environment or reused. The mixed waste gas is discharged from the exhaust port 4, and sent to a torch unit after the water in it is removed by a cyclone deliquoring tank 1-6. The gaseous organic matter entrained by the mixed waste gas from the regeneration process of the fluidized bed is burned to achieve near-zero emission of pollutants. As the fiber coalescer runs continuously, the waste oil is also sent to the buffer settling tank 1-5 through the top oil phase outlet 5-8 for settling, and then sent together with the waste oil generated by regeneration of the fluidized bed to the waste oil refining system.

The working principle of the fluidized bed separator of the present disclosure is as follows:

During normal operation, washing water is drawn out from the bottom of the water washing tower 1-2 by a centrifugal pump, enters the fluidized bed separator 1-3 from the inlet 1 at the top of the fluidized bed separator 1-3, and is sent to the granular bed layer through the feed distributor 4-5. After being separated by the granular bed 4-2, the washing water passes through the fluid distributor 4-4 on the partition plate 4-3, and is sent to the fiber coalescer 1-4 from the outlet at the bottom after passing through the vortex breaker 4-6. After the device is switched to backwash operation, the inlet valve 2-1 and outlet valve 2-2 are closed, and the drain valve 2-3, exhaust valve 2-4, nitrogen/steam access valve 2-5 and backwash valve 2-6 are opened. Then, the washing water enters the fluidized bed separator 1-3 from the outlet 2 instead, and nitrogen is mixed into the washing water at the same time. The washing water passes through the granular bed from bottom to top to bring the bed to a boiling state. The fine catalyst powder and oil-wax organic matter adhered to a separating medium are released, thereby cleaning and regenerating the medium. The separating medium and pollutants enter the three-phase cyclone separator 4-7 at the top of the fluidized bed separator, so that the medium particles are washed in a cyclone field, regeneration of the medium is strengthened, and the medium particles are recovered at the same time. The pollutants are discharged from the drain port 3 at the side surface of the device along with the liquid phase, and nitrogen is discharged from the exhaust port 4 at the top.

The fluidized bed separator of the present disclosure is equipped with an industrial control computer, and a pressure difference value (filtration pressure drop) is set on the industrial control computer. When the filtration pressure drop reaches the set value, the fluidized bed separator can be automatically switched to the regeneration state for cleaning and regeneration of the separating medium. The industrial control computer enables the fluidized bed separator to implement filtration of the washing water and effective regeneration of the separating medium without manual control. As an example of the industrial control computer, Siemens S7-300 Industrial Control Computer may be used. Its control interface is shown in FIG. 6. The main function of the industrial control computer is to control the opening and closing of the inlet valve 2-1, outlet valve 2-2, drain valve 2-3, exhaust valve 2-4, nitrogen/steam access valve 2-5, backwash valve 2-6 of each fluidized bed separator to effectuate switch between different states, so as to achieve the purpose of automatic control. Specifically, it monitors the open/close state of each valve and the real-time data of the filtration pressure difference in the fluidized bed separator. Based on the feedback relationship between the real-time data of the pressure difference and the set upper limit of the pressure difference, the six main valves perform the opening/closing operation according to the logic preset by the system to achieve the purpose of switching online between the filtrating state and the backwashing state of the fluidized bed. During the normal operation of the fluidized bed separator for filtration, the inlet valve 2-1 and the outlet valve 2-2 are in an open state. When the filtration pressure drop reaches the set value, the device switches to the backwashing operation. Specifically, the inlet valve 2-1 and the outlet valve 2-2 are closed in sequence. Then, the drain valve 2-3 and the exhaust valve 2-4 are opened at the same time, and the backwash valve 2-6 and the nitrogen/steam access valve 2-5 are opened at the same time. The washing water enters the fluidized bed separator from the outlet 2 instead. Nitrogen is mixed into the washing water at the same time. The washing water passes through the granular bed layer from bottom to top to activate the operation of the device for regeneration of the separating medium. When the duration of the regeneration operation reaches the set value, the backwash valve 2-6 and the nitrogen/steam access valve 2-5 are closed at the same time, and the drain valve 2-3 and the exhaust valve 2-4 are closed at the same time. Then, the outlet valve 2-2 and the inlet valve 2-1 are opened in sequence. As such, the fluidized bed separator goes into normal operation for filtration again. According to the present disclosure, when the filtration pressure drop reaches the set value of 0.3 MPa, the device switches to the backwashing operation.

The cyclone shearing action provided by the three-phase cyclone separator 4-7 at the top of the fluidized bed separator during the regeneration of the fluidized bed separator strengthens the regeneration effect of the separating medium, and helps to achieve recovery of the medium particles at the same time. Anthracite, carbon spheres and other filter materials capable of removing oil and solids are used for the separating medium in the fluidized bed separator. They exhibit good effect in adsorbing and intercepting catalyst particles, free oil and dispersed oil in washing water.

The working principle of the fiber coalescer of the present disclosure is as follows:

During normal operation, the washing water enters the fiber coalescer through the inlet 5-2 of the fiber coalescer, passes through the inlet rectifying distributor 5-3, and then enters the oil droplet coarsening coalescing module 5-4, the modified corrugated reinforced settling module 5-5 and the nano-modified deep separation module 5-6 in sequence, so that fine emulsified oil droplets left in the washing water from the outlet of the fluidized bed are subjected to adhesion to a hydrophilic-hydrophobic fiber, collision, growth and separation to allow for gradual movement of the oil droplets to the upper oil layer and rapid sinking of water droplets. The clear liquor of the washing water is discharged from the aqueous phase outlet 5-7 and returned to a washing water circulation heat exchange system. The waste oil is discharged from the oil phase outlet 5-8 to the buffer settling tank to achieve oil-water separation.

The fiber coalescer housing 5-1 of the fiber coalescer according to the present disclosure is a horizontal circular tank or a horizontal cuboid tank. Continuous discharge occurs at the aqueous phase outlet 5-7, and intermittent discharge or small flow continuous discharge occurs at the oil phase outlet 5-8. The oil droplet coarsening coalescence module is composed of a packed bed formed from a solid material having a lipophilic surface. Fine oil droplets in water can adhere to the surface of the packed bed, and gradually accumulate into large oil droplets, so that their separation is accelerated. A corrugated baffle plate having a lipophilic surface is used as the modified corrugated reinforced settling module. The oil droplets gather at the corrugation peak of the baffle plate and rise to the oil layer. The water droplets gather at the concave of the baffle plate, coalesce, grow up, and then sink rapidly. The nano-modified deep separation module 5-6, which is the core unit of the fiber coalescer, employs a coalescence module prepared from an organic polymer material, mainly nylon, glass, Teflon or metal wool. The material is woven in an Q form. The emulsified oil in the washing water can be separated quickly and efficiently.

With the implementation of the method of the present disclosure, after the separation by the fluidized bed, the content of suspended solids in the washing water is reduced to 20 mg/L or less, and the oil content is reduced to 150 mg/L or less. After the deep purification by the fiber coalescer, the oil content in the washing water drops to 30 mg/L or less.

EXAMPLES

The present disclosure will be further illustrated with reference to the following specific Examples. It is nevertheless to be appreciated that these Examples are only intended to exemplify the present disclosure without limiting the scope of the present disclosure. The test methods in the following examples for which no specific conditions are indicated will be carried out generally under conventional conditions or under those conditions suggested by the manufacturers. Unless otherwise specified, all parts are parts by weight, and all percentages are percentages by weight.

Example 1

In a 1.8 million tons/year methanol-to-olefins process, the device of the present disclosure was used to deeply purify washing water containing solid catalyst and oil-wax, so as to achieve the purpose of effectively separating the particulate matter and oil-wax from the washing water. The test parameters and effects are as follows:

1. Material Properties and Processing Methods

The methanol-to-olefins washing water was a liquid-solid two-phase mixture. The water contained solid catalyst particles and oil. The main components of the oil were high-concentration aromatic hydrocarbons resistant to degradation. The operating temperature was 90° C. The content of the waste catalyst was 100-500 mg/L, and its average particle size was 2 μm. The oil content was 200-1000 mg/L.

As regards the 1.8 million tons/year methanol-to-olefins process under study, the main measures currently taken in the prior art include continuous discharge of the washing water at a flow rate of 160 t/h, replenishing of fresh water to balance the solid content and oil content in the washing water, and continuous infusion of xylene to alleviate settling of the catalyst and oil-based organic matter and blockage caused by them. Although such measures can alleviate the blockage of the methanol-to-olefins water system, the water consumption is large, and the economy is poor. In addition, the load of the downstream sewage stripper and sewage treatment plant is increased, and the heat of the discharged wastewater is difficult to be used. For example, if washing water is discharged at 90° C., when it is cooled to ambient temperature of 25° C., the heat loss of 1 ton of wastewater is about 270 MJ. If the washing water is discharged at 160 t/h, the daily heat loss is 1036800 MJ, equivalent to 35.4 tons of standard coal/day. Therefore, the measures adopted currently are disadvantageous in terms of safety, environmental protection and economy.

2. Washing Water Purification Device

The washing water purification device was a device comprising a fluidized bed separator and a fiber coalescer connected in series. The fluidized bed separator had a diameter of 300 mm and a height of 1500 mm. A three-phase cyclone separator was installed on the top. The separating medium was a filter material of anthracite particles having a particle size of 0.5-1 mm. The bed height was 1300 mm. The processing capacity of a single filter was 1 m³/h. The fiber coalescer was a horizontal vessel. The water inlet, water outlet and oil outlet were all equipped with sight glasses. The oil was discharged intermittently or continuously at a small flow rate from the oil phase outlet. The water was discharged continuously from the aqueous phase outlet. The bottom of the coalescer was equipped with a drain port.

3. Implementation Process

As shown by FIG. 2, the methanol-to-olefins washing water containing catalyst and oil-wax was sent to the fluidized bed separator by a centrifugal pump to remove the catalyst particles, free oil and dispersed oil, and then entered the fiber coalescer for deep removal of the emulsified oil in the washing water. After the fluidized bed separator ran continuously till the pressure difference rose to 0.3 MPa, it was switched to backwashing operation. The regeneration liquid from the fluidized bed was sent to a buffer settling tank to stand for oil-water separation. The upper oil phase was sent together with the waste oil discharged from the coalescer to a waste oil refining system. The lower layer of catalyst slurry was sent to a pressure filtration unit for pressure filtration treatment to recover the catalyst. The waste water generated in the pressure filtration unit was sent to a sewage treatment plant.

4. Result Analysis

With the use of the purification process combining fluidized bed separation and fiber coalescence, the solid content in the washing water was reduced from 100-500 mg/L to 20 mg/L or less, and the oil content was reduced from 200-1000 mg/L to 30 mg/L or less. In the tests, after 1000 hours of continuous running with the fluidized bed separator being backwashed 50 times for regeneration, the initial separating effect was still maintained, and the separation efficiency exceeded 90%.

5. Technical Effects

In recent years, microcyclone separation, metal membrane separation, ceramic membrane separation and bag filtration have been gradually applied in the purification process of methanol-to-olefins wastewater. Based on domestic field research, the inventors of the present application have discovered that the above methods all have certain deficiencies. Thus, the purification of methanol-to-olefins wastewater has always been a big challenge that is difficult to be addressed in the MTO industry. Microcyclones and metal membranes are employed in more than 10 sets of MTO equipment. These two devices are generally operated in series, wherein the microcyclone is used for primary separation, and the metal membrane is used for deep purification. The separation precision of the microcyclone separator is low. It only shows a good separating effect on particles larger than 3 microns, and it has difficulty in separating particles smaller than 3 microns. Due to the problem of membrane fouling in metal membrane microfiltration, the membrane flux will be reduced to 20% or less of the normal membrane flux within one month of operation, rendering it difficult to operate normally. Ceramic membranes and bag filters are added in technical transformation in some MTO plants. Ceramic membranes are effective in filtering fine particles in methanol-to-olefins wastewater, but the equipment cost is high, and the pressure across the membrane is high. In addition, the problem of membrane channel blockage will gradually arise after more than one year of operation. Currently, ceramic membranes are used in 3 sets of MTO equipment for wastewater purification. Due to the low separation precision and short life of the bag filtration method, the treatment efficiency will be significantly reduced after one year of operation, and this problem needs to be solved by replacing the filter bag. This method is used in only one MTO plant.

Compared with the technologies that have been applied, the fluidized bed separation technology is second only to the ceramic membrane separation technology in terms of separation efficiency. Nevertheless, the fluidized bed separation technology is based on the principle of deep filtration, and the filtration channels are formed by accumulation of loose filter material particles. As a result, the channels are variable. In principle, the problem of fouling and clogging of metal membranes or ceramic membranes is avoided. The granular bed of the filter material has a large porosity, and the particles to be filtered can be accommodated in the voids between the filter material particles. Hence, the pollutant holding capacity of the granular bed is large, and the granular bed needs to be backwashed notably less frequently than the surface filtration methods such as metal membrane filtration and ceramic membrane filtration. On the other hand, since the channels are variable, the pollutants retained in the channels can be released easily. In addition, cyclone is introduced to strengthen the flushing, so the pollutants can be easily detached from the surface of the filter material. Therefore, the filter material can be regenerated more effectively than a traditional deep filtration device. Additionally, since the filter material can be selected from traditional anthracite, carbon spheres and the like which are cheap in price, the equipment investment and maintenance fee are very low.

A comparison of several methanol-to-olefins wastewater treatment technologies in industrial applications (based on a treatment capacity of 200 m$^3$/h) is shown in Table 1 below. The fluidized bed separation technology is superior to the other technologies in terms of equipment investment, handling expenses, operating costs, sewage discharge frequency, and separation energy consumption. Its separation efficiency is second only to that of the ceramic membrane technology and is sufficient for separation of fine catalyst particles in an MTO water system. Nonetheless, it needs a larger space than the other technologies. A comprehensive assessment shows that the fluidized bed separation technology has excellent performance in purification of MTO wastewater, so it is more suitable for industrial treatment of MTO wastewater.

TABLE 1

Comparison of different MTO wastewater purification technologies

| Technology name | Fluidized bed separation | Microcyclone separation | Metal membrane | Ceramic membrane | Bag filtration |
|---|---|---|---|---|---|
| Separation efficiency (%) | 90-99 | 20-60 | 95-99 | >99 | 30-60 |
| Pressure drop (MPa) | 0.2-0.3 | 0.2-0.3 | 0.2-0.5 | 0.3-0.6 | 0.2-0.5 |
| Footprint (m$^2$) | 70-80 | 30-40 | 35-45 | 35-45 | 35-45 |
| Water recycling rate (%) | 98 | 95 | Unable to operate normally | 90 | 90 |
| Backwash cycle (h) | 24-96 | No backwash | <1 | 2-8 | 3-5 |

TABLE 1-continued

Comparison of different MTO wastewater purification technologies

| Technology name | Fluidized bed separation | Microcyclone separation | Metal membrane | Ceramic membrane | Bag filtration |
|---|---|---|---|---|---|
| Equipment investment (million dollars) | 0.8-1.0 | 0.6-0.8 | 1.5-1.8 | 2.2-2.8 | 1.4-1.7 |
| Maintenance fee (thousand dollars) | 8-12 | 8-12 | Unable to operate normally | 500-1000 | 100-120 |

The fiber coalescence technology has also been successfully applied in the treatment of highly emulsified oil-containing wastewater on the 100-billion-ton gas field platform in the South China Sea. The fiber coalescer has a compact structure and high impact resistance, and exempts the use of an emulsion breaker which is used in the prior art oil removal process. The fiber coalescence technology has obvious technical and economic advantages. Specifically, the separation is rapid and efficient; the pressure drop is low (the pressure drop is less than 0.3 MPa); and the energy consumption is low. The modular design allows for flexible control of the footprint according to the actual situation. The service life is long, and the operation and maintenance costs are low. A comparison of the oil removal technology with fiber coalescence and the prior art oil removal technology using a reagent to break emulsion is shown in Table 2 below.

TABLE 2

Comparison of the oil removal technology with fiber coalescence and the oil removal technology using a reagent to break emulsion

| Technical principle | Oil removal efficiency (%) | Oil content after treatment (mg/L) | Investment cost (%) |
|---|---|---|---|
| Chemical demulsification | 60-80 | 200-250 | 100 |
| Coalescence demulsification | 98 | 15-25 | 60 |

According to the present disclosure, the granular bed filtration method and the fiber coalescence method are combined creatively for highly efficient separation of the fine catalyst powder and oil in methanol-to-olefins washing water. This combination makes up for the insufficient efficiency for separating the oil in the washing water by a fluidized bed separator, and also effectively avoids the pollution problem of the inner parts of the fiber coalescer caused by the catalyst particles in the washing water, so as to achieve the purpose of deep purification. Particularly, anthracite, carbon spheres or other filter materials for oil and solid removal are used for the separating medium in free oil and dispersed oil in the washing water. Subsequently, the emulsified oil in the washing water is adhered to the hydrophilic-hydrophobic fiber woven in the form of Q in the fiber coalescer, collides, grows and separates, so that physical demulsification is achieved, and then the emulsified oil in the washing water is removed. The industrial side-line pilot test and the industrial application of the present disclosure can realize not only deep removal of the nano-micron particles and oil-wax in the washing water, and recycling of the water, but also refining of the waste oil, concentration and recovery of the catalyst, harmless treatment of the regenerated waste gas, and partial recovery of the residual heat of the washing water, thereby achieving comprehensive treatment of the methanol-to-olefins washing water. The concentration of the suspended matter in the effluent water is reduced to 20 mg/L or less, and the oil content is reduced to 30 mg/L or less. The frequency for cleaning the heat exchanger and air cooler in the washing water treatment system can be reduced by more than 80%, and the blockage of the water washing tower and the stripping tower is reduced effectively. Moreover, the original 160t/h washing water discharge can be eliminated. In the case that the washing water is used as a heat source for the reboiler under the propylene rectification tower in the olefin separation unit to recover part of the residual heat, assuming that the washing water is discharged at 90° C., when it is cooled to 65° C. due to the residual heat recovery, the heat recovered is about 100 MJ per ton of wastewater. Based on discharge of the washing water at 160 t/h, 384000 MJ of heat per day can be saved, equivalent to 13.1 tons of standard coal per day. In addition, the washing water containing oil and solids is highly concentrated organic wastewater resistant to degradation. When it is discharged to a sewage treatment plant at a flow rate of 160t/h according to the prior art, the cost of sewage treatment will be increased. Now, according to the present disclosure, the wastewater discharged to the sewage treatment plant is mainly produced by the pressure filtration unit and contains a trace amount of oil and solids, and the average discharge is 3t/h. Assuming that the treatment cost is 10 Yuan per ton of water, 12.56 million Yuan/year can be saved for treatment of the washing water.

The Examples listed above are only preferred examples in the disclosure, and they are not intended to limit the scope of the disclosure. Equivalent variations and modifications according to the disclosure in the scope of the present application for invention all fall in the technical scope of the disclosure.

All of the documents mentioned in the disclosure are incorporated herein by reference, as if each of them were incorporated herein individually by reference. It is to be further understood that various changes or modifications to the disclosure can be made by those skilled in the art after reading the above teachings of the disclosure, and these equivalent variations fall in the scope defined by the accompanying claims of the application as well.

What is claimed is:

1. A method for deep purification of methanol-to-olefins washing water using a device wherein the device comprising: a quench tower (1-1), a water washing tower (1-2) coupled to an outlet at a top of the quench tower (1-1), a fluidized bed separator (1-3) whose top is coupled to a bottom of the water washing tower (1-2), a fiber coalescer (1-4) coupled to a bottom of the fluidized bed separator (1-3), and a buffer settling tank (1-5) coupled to a sidewall of the fluidized bed separator (1-3) at a position near the top, and the method comprises the following steps:

Step 1: Starting a power supply, and setting a filter pressure drop value and a regeneration operation time for the fluidized bed separator using an industrial control computer (1-9);

Step 2: Opening an inlet valve (2-1) and an outlet valve (2-2) to allow for normal operation of the device, wherein the washing water is drawn out from the bottom of the water washing tower (1-2) through a centrifugal pump, and enters the fluidized bed separator (1-3) through an inlet (1) at the top of the fluidized bed separator (1-3) in which the washing water is sent to a granular bed (4-2) through a feed distributor (4-5), wherein after the washing water is separated by a granular bed (4-2), it passes through a fluid distributor (4-4) on a partition plate (4-3), passes through a vortex breaker (4-6), and is sent to the fiber coalescer (1-4) from an outlet (2) at the bottom of the fluidized bed separator (1-3), wherein the washing water enters the fiber coalescer (1-4) through an inlet (5-2) of the fiber coalescer (1-4) in which the washing water passes through an inlet rectification distributor (5-3) and enters an oil droplet coarsening coalescence module (5-4), a modified corrugated reinforced settling module (5-5) and a nano-modified deep separation module (5-6) in sequence, so that fine emulsified oil droplets left in the washing water from an outlet of the fluidized bed are subjected to adhesion to a hydrophilic-hydrophobic fiber, collision, growth and separation to allow for gradual movement of the oil droplets to an upper oil layer and rapid sinking of water droplets, wherein a clear liquor of the washing water is discharged from an aqueous phase outlet (5-7) and sent to a reboiler under a propylene rectification column of an olefin separating device as a heat source for partial recovery of residual heat of the washing water, wherein after heat exchange, a clear liquor is subjected to further heat exchange through an air cooler and a heat exchanger for the washing water, and is returned to the water washing tower (1-2), wherein a waste oil is discharged from an oil phase outlet (5-8) to the buffer settling tank (1-5) to achieve oil-water separation, wherein differential pressure transducer (1-10) values of the fluidized bed separator (1-3) are monitored in real time during the normal operation of the device;

Step 3: starting a regeneration operation when set filter pressure drop value is detected by a differential pressure transducer (1-10), at which time the inlet valve (2-1) and the outlet valve (2-2) are closed; a drain valve (2-3), an exhaust valve (2-4), a backwash valve (2-6), and a nitrogen/steam access valve (2-5) are opened, wherein the washing water is changed to enter the fluidized bed separator (1-3) from the outlet (2), and at the same time nitrogen is mixed into the washing water which then passes through the granular bed (4-2) from bottom to top to bring the granular bed (4-2) to a boiling state, so that a fine catalyst powder and an oil-wax organic matter adhered to a separating medium are released, thereby cleaning and regenerating the medium, wherein the separating medium and pollutants enter a three-phase cyclone separator (4-7) at the top of the fluidized bed separator to allow for cleaning of particles of the medium in a cyclone field, strengthened regeneration of the medium, and recovery of the particles of the medium at the same time, wherein the pollutants are discharged from a drain port (3) at a side surface of the device along with a liquid phase, and nitrogen is discharged from an exhaust port (4) at the top; and Step 4: Closing the drain valve (2-3), the exhaust valve (2-4), the backwash valve (2-6), and the nitrogen/steam access valve (2-5), and opening the inlet valve (2-1) and the outlet valve (2-2) when the set regeneration operation time is reached, so that the device continues to operate normally wherein in step 1, the filter pressure drop value is set to 0.1-0.3 MPa; the regeneration operation time is set to 20-60 minutes; and a separation precision of the catalyst in the washing water is set to D85=0.1 um.

2. The method of claim 1, wherein a content of the catalyst particles in the methanol-to-olefins washing water is 100-500 mg/L; an average particle diameter of the solid catalyst particles is 0.5-5 μm; and a content of the oil is 200-1000 mg/L.

\* \* \* \* \*